MILLER & HENRY.
Side-Hill Plow.

No. 29,708.  Patented Aug 21, 1860.

Witnesses:
James W. Endley
John Clute

Inventor:
Miller & Henry
Knight Brothers Attorneys

UNITED STATES PATENT OFFICE.

GEO. C. MILLER AND RICHARD HENRY, OF CINCINNATI, OHIO.

IMPROVEMENT IN HILLSIDE-PLOWS.

Specification forming part of Letters Patent No. 29,708, dated August 21, 1860.

*To all whom it may concern:*

Be it known that we, GEO. C. MILLER and RICHARD HENRY, both of Cincinnati, Hamilton county, Ohio, have invented a certain new and useful Improvement in Plows; and we hereby declare the following to be a full, clear, and exact description thereof, reference being had to the accompanying drawings, making part of this specification.

The invention relates to the class known as "reversible" or "hillside" plows; and it consists in, first, a share constructed of one entire piece of steel or wrought-iron, in combination with a cast swivel bolted to its under side and intended to supersede the present cast-iron shares in this kind of plows, which are well known to be so deficient in strength and in scouring qualities as to greatly circumscribe their usefulness; second, a combination with the reversible mold-board of an adjustable segmental bracket, in manner hereinafter explained.

Figure 1:
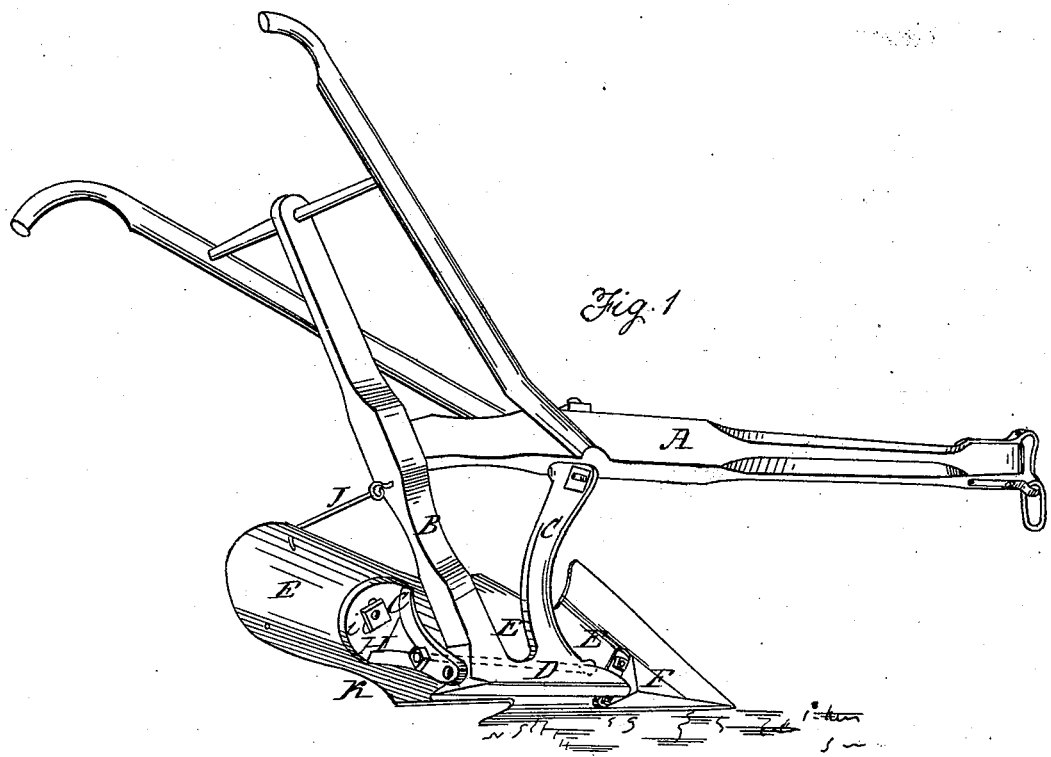
Figure 2:
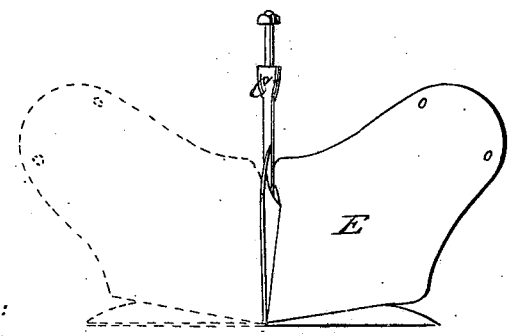

In the accompanying drawings, Figure 1 is a perspective view of a plow embodying our improvement. Fig. 2 is a front view, showing by red and black lines the right and left positions, respectively, of the share.

A B C D represent respectively a beam, standard, sheth, and landside, which may be of customary construction for hillside-plows. The share E, instead of consisting of several pieces of cast-iron, is formed of a single plate of steel or wrought-iron. The swivel F, instead of being a mere projection from the substance of the share, is a distinct casting, which is bolted to the under side of the share. The bolt G, by which the bracket H is attached to the share, passes through a slotted aperture, *i*, in the bracket, so as to permit the lateral adjustment of the latter, and thus enable the husbandman to give an equal amount of land to the plow in each direction. J is a hook, and K a brace-rod of usual form.

The described construction of share has over the usual cast-iron share of reversible plows the following advantages: The implement is much lighter. It cuts its way more easily through the ground. It scours more perfectly. It is less liable to fracture.

We claim as new and of our invention herein—

1. The described combination of the reversible share and mold-board E, when formed entire of steel or wrought-iron, and the separate cast swivel F, the said parts being constructed and arranged and connected in the manner and for the purposes set forth.

2. The combination of the segmental bracket H, slot *i*, clamp-screw G, and mold-board E, when constructed, arranged, and operating in the manner and for the purposes set forth.

In testimony of which invention we hereunto set our hands.

GEO. C. MILLER.
RICHARD HENRY.

Witnesses:
GEO. H. KNIGHT,
C. STEEMER, Jr.